Patented June 3, 1930

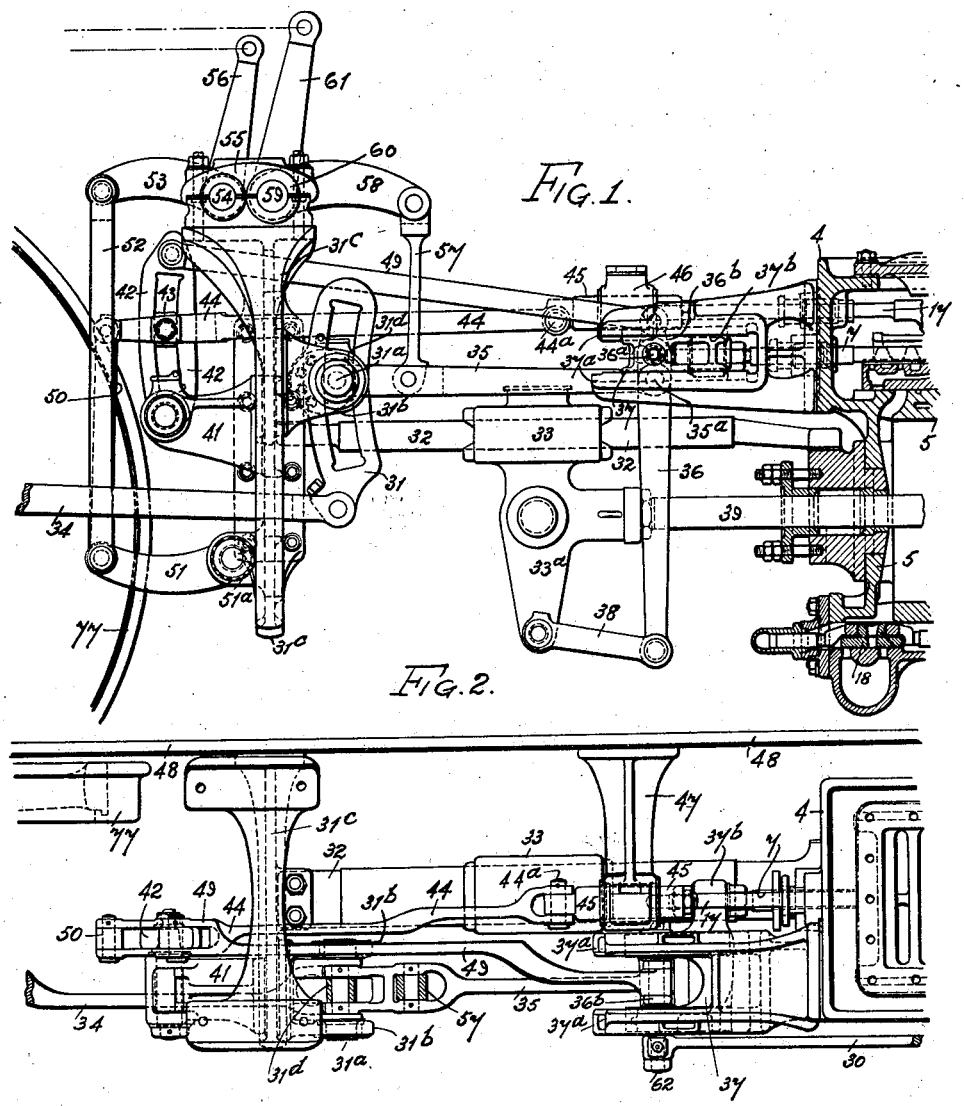

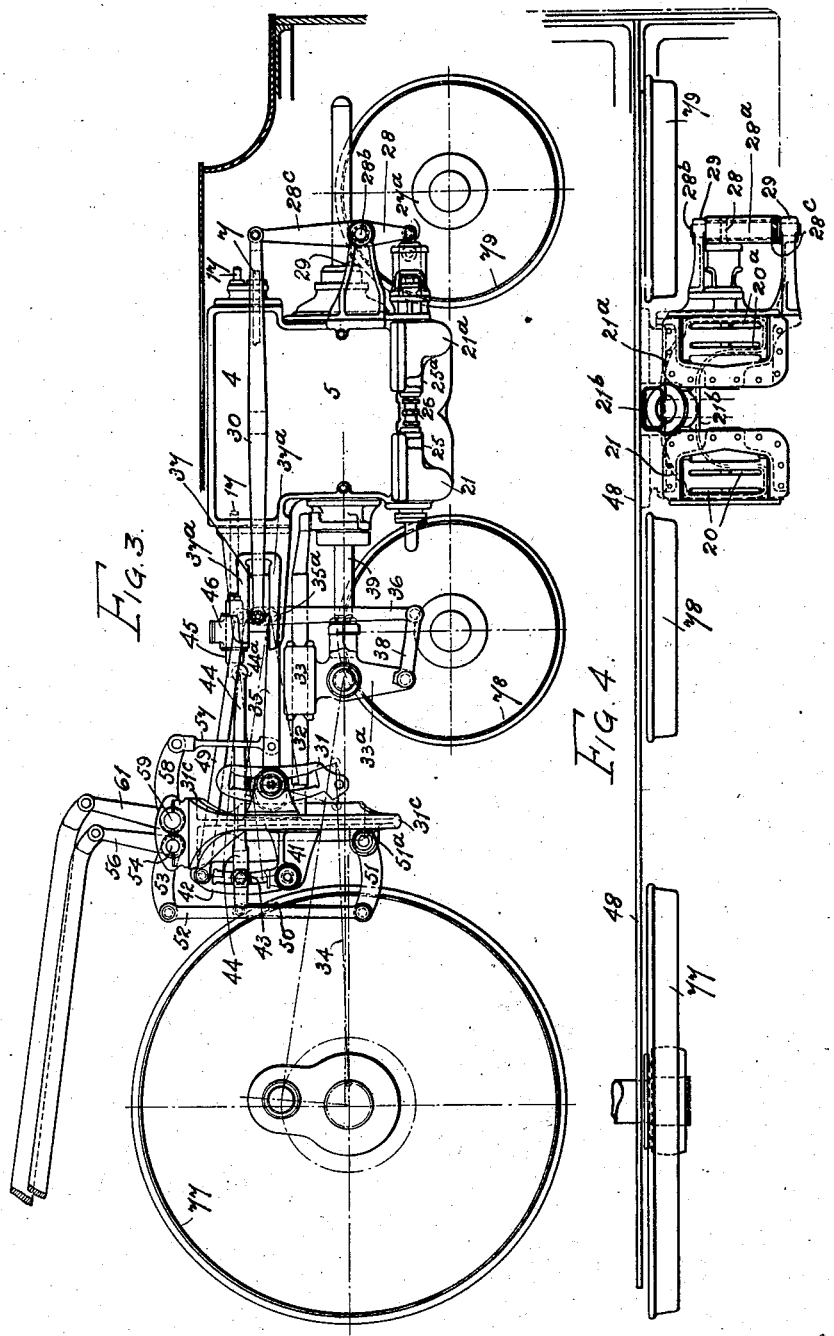

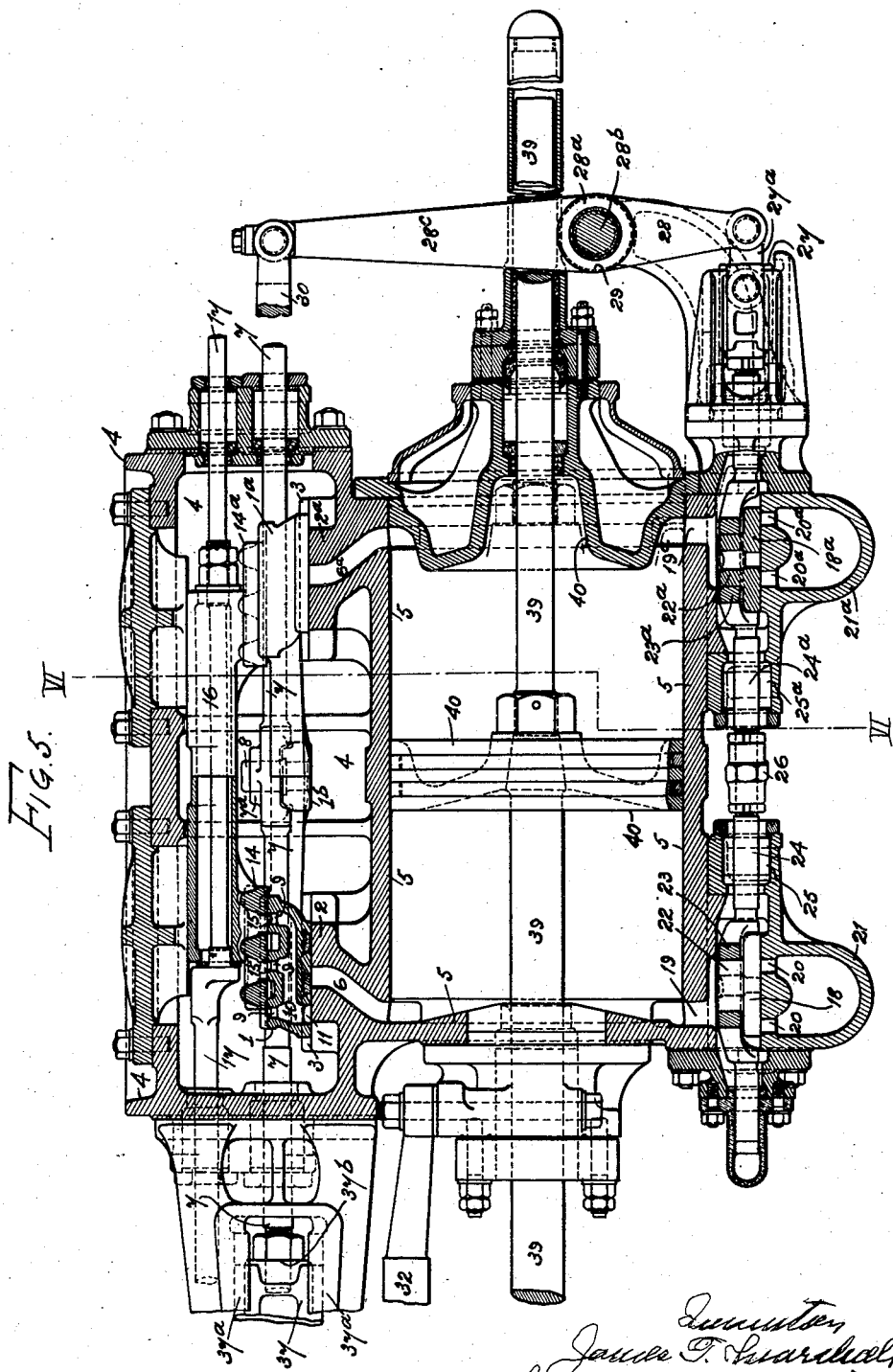

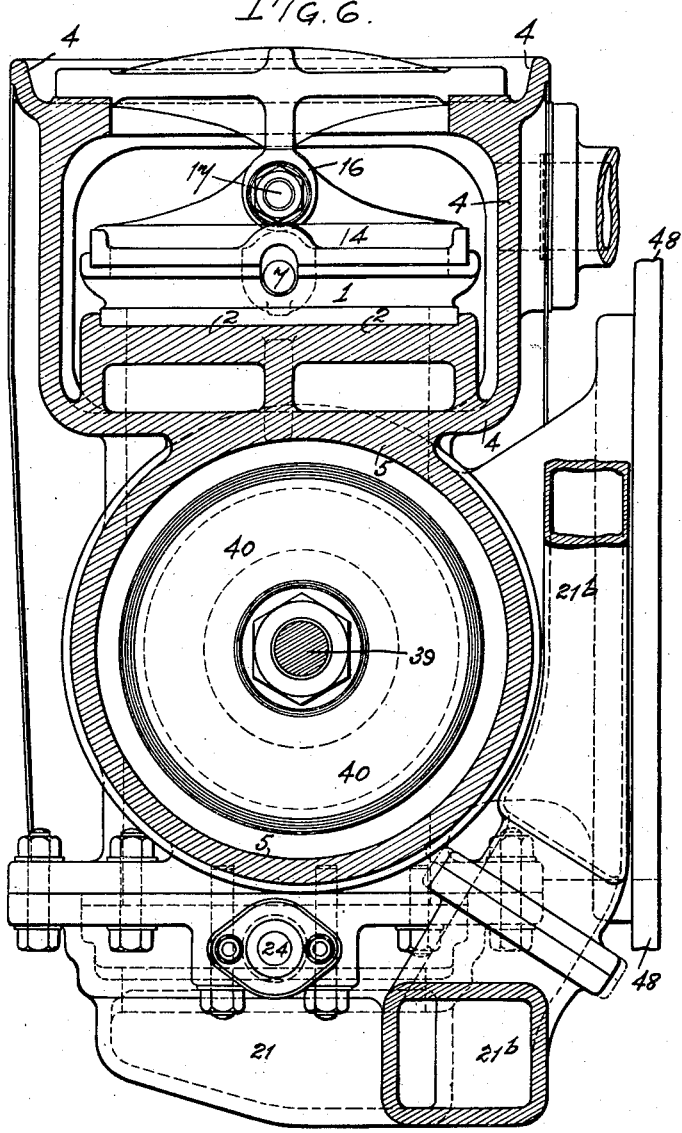

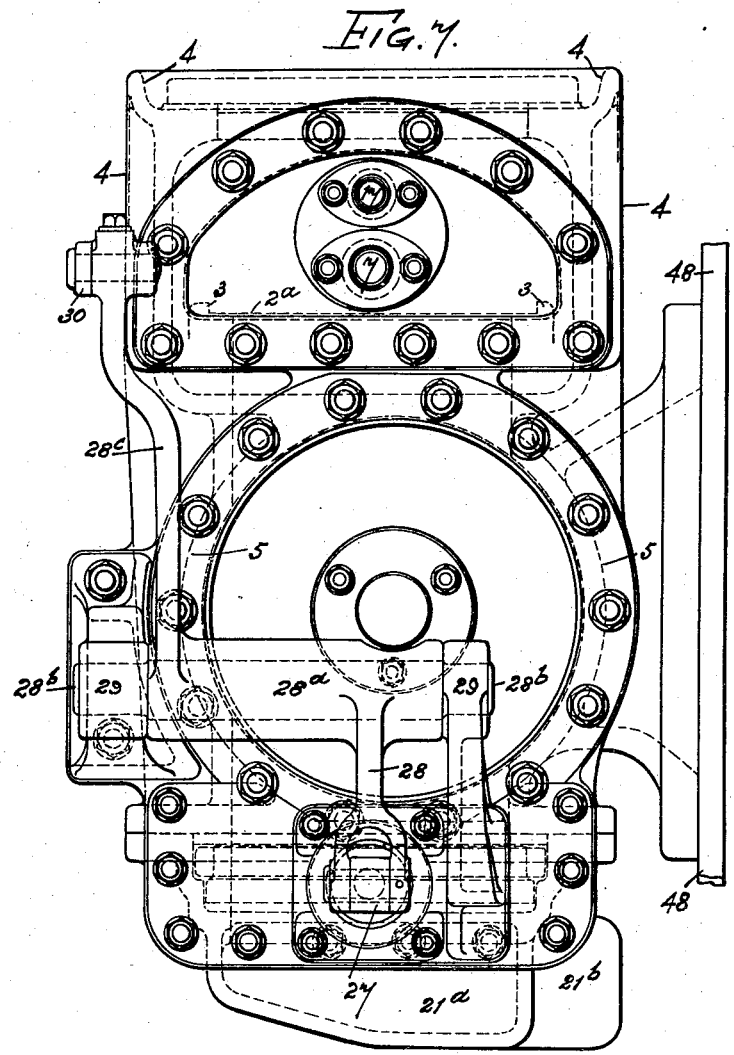

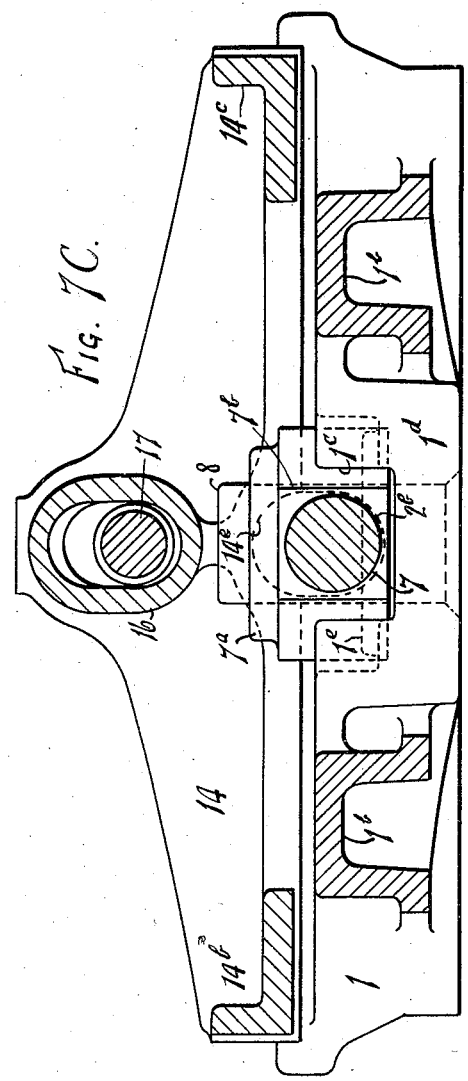
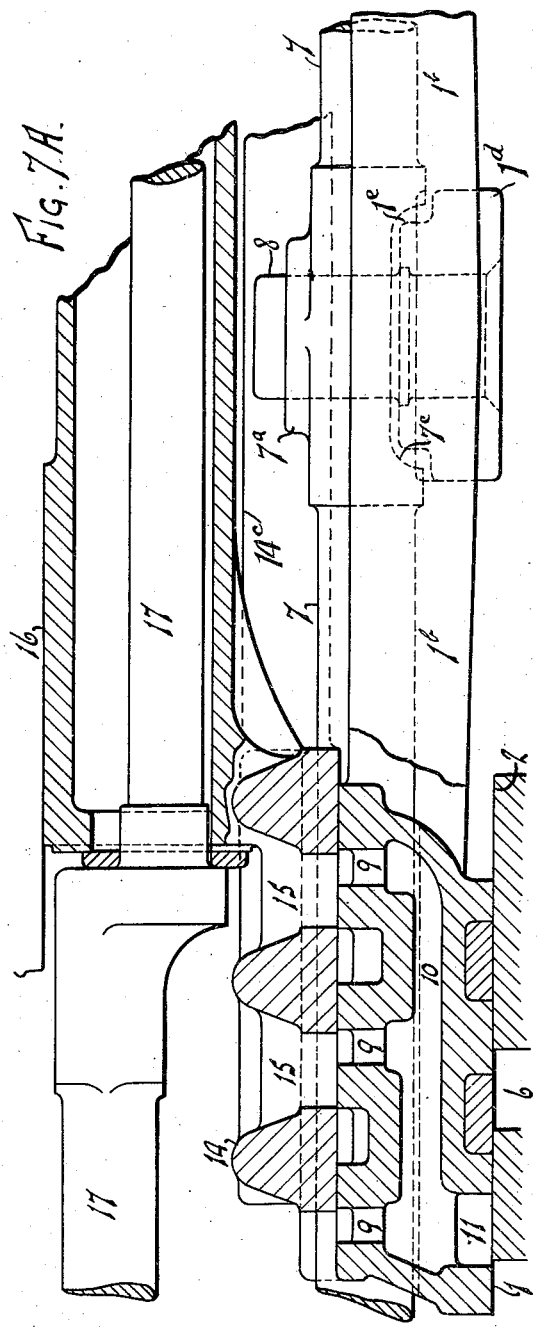

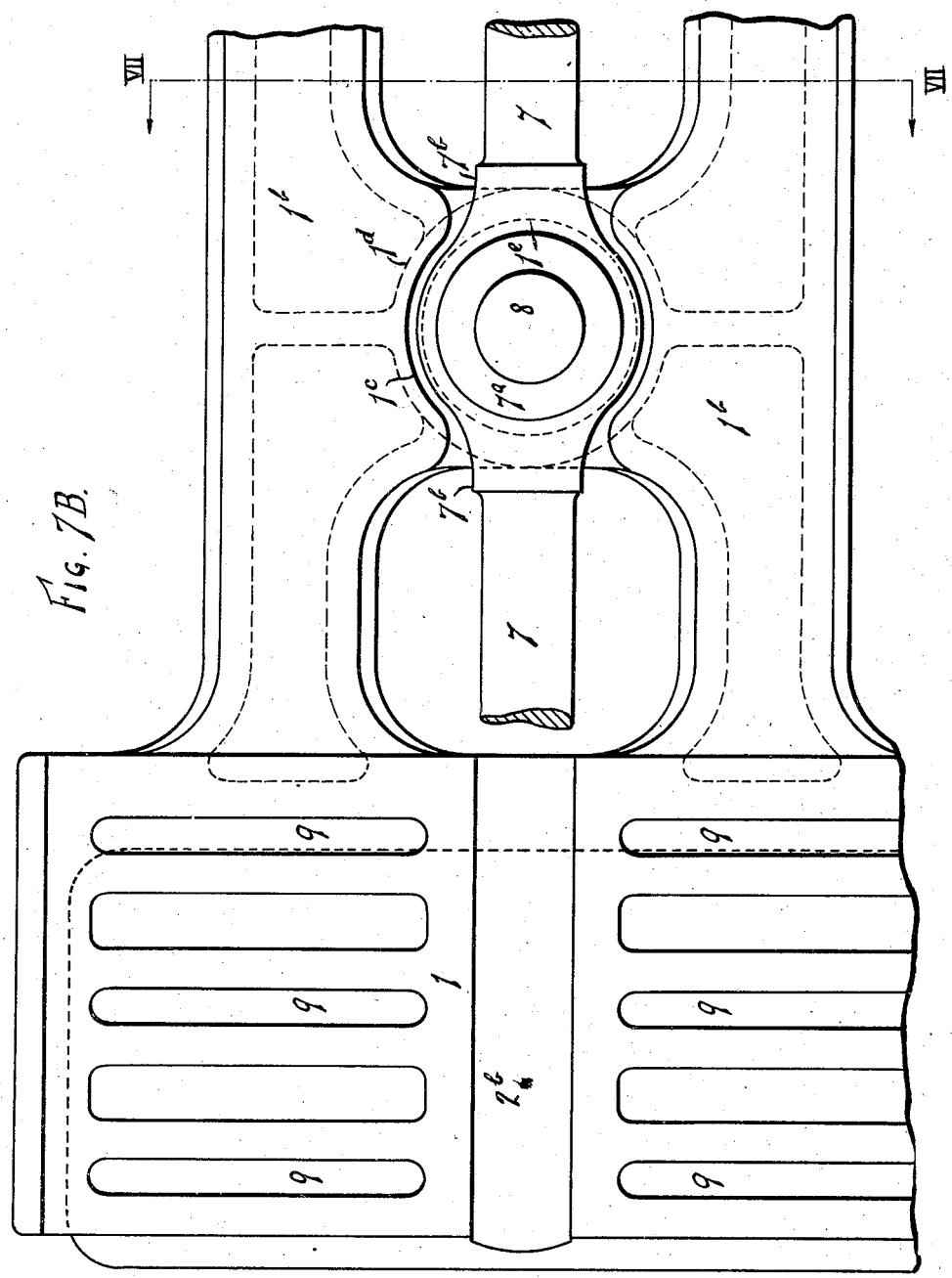

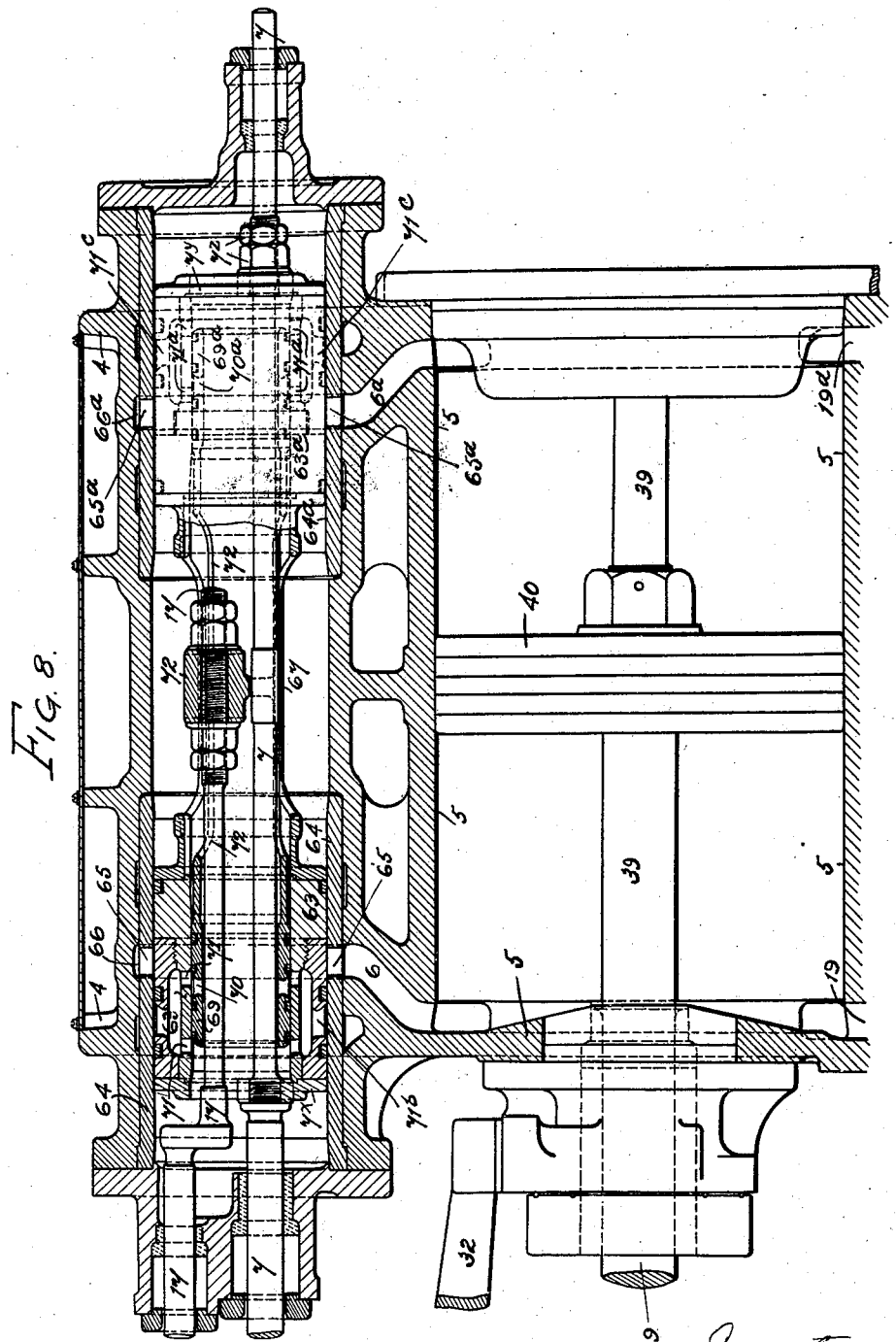

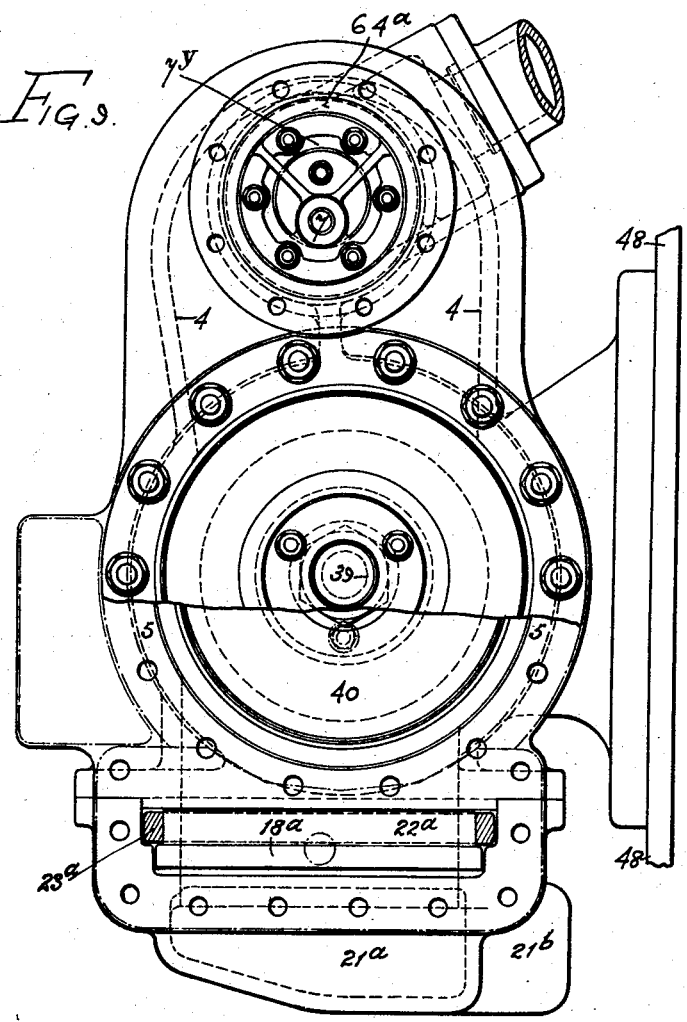
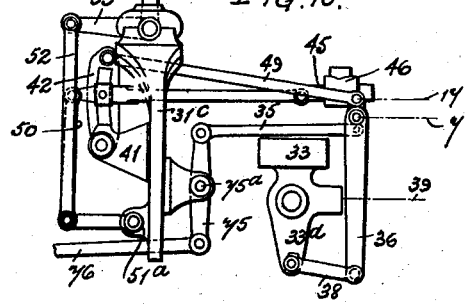

1,760,952

UNITED STATES PATENT OFFICE

JAMES THOMPSON MARSHALL, OF HARROGATE, ENGLAND

MOTIVE-FLUID ENGINE

Application filed May 7, 1926, Serial No. 107,417, and in Great Britain May 11, 1925.

This invention relates to motive fluid engines and particularly to those of the reciprocating type of construction designed for reversing. It aims to provide improvements in such engines, hereinafter called "steam engines," provided with expansion valves, wherein such valves are actuated directly from valve gear for operating the main valves which control steam admission.

The principal object of the invention is to simplify the construction of the engine valve gear and at the same time to provide for a full, quick admission of steam to the cylinders, followed duly by a quick cut-off of the steam, so as to prevent "wire-drawing" thereof and also to provide for separate exhaust of the steam.

Another object is to provide for steam admission and exhaust for each cylinder independently of each other in such manner that free exhaust can take place independently of admission, even when the admission is cut-off during the earliest part of the piston stroke, so as to avoid setting up heavy back pressures causing serious loss of power and efficiency in engines as heretofore constructed (particularly those of the reversing type), owing chiefly to the present practice of adjusting slotted links or slide blocks of appurtenant valve gear when the engine is running at high speed.

An engine embodying valve gear according to this invention and provided with exhaust valves separate from the main steam admission valves and from the expansion valves is illustrated in the appended drawings to which reference will be made in further describing the invention.

In said drawings:

Fig. 1 is a side elevation of an embodiment of the invention with one form of valve gear for operating the main steam admission, expansion and exhaust valves of a reversing engine;

Fig. 2 is a plan view thereof;

Fig. 3 illustrates a general arrangement of the valve gear as applied to the engine cylinder of a locomotive;

Fig. 4 is a part plan of the structure shown in Fig. 3;

Fig. 5 is a part elevation and part longitudinal section illustrating the engine cylinder with separate main steam admission, expansion and exhaust valves;

Fig. 6 is a cross-sectional view on the line VI—VI of Fig. 5;

Fig. 7 is a view of the right hand end of the cylinder and associated parts shown in Fig. 5;

Fig. 7A is a part side elevation and part section of the valve shown in Fig. 5, but on larger scale;

Fig. 7B is a plan view of the structure shown in Fig. 7A, but with the expansion valve removed;

Fig. 7C is a cross-section on the line line VII—VII of Fig. 7B;

Fig. 8 is a view similar to Fig. 5 illustrating a cylinder provided with main steam and expansion valves of modified form;

Fig. 9 is a right hand end view of the structure of Fig. 8 with parts removed and partly in section; and Fig. 10 diagrammatically illustrates a modification of structure embodying an oscillating lever adapting the engine for use as a non-reversing engine.

The above defined figures are drawn to different scales and in some of them parts are omitted to show other parts more clearly.

In the example of reversible steam engine illustrated in Figs. 1 to 7C inclusive, two main steam admission valves 1 and 1$^a$ of flat slide valve form are employed. These valves are shown reciprocable on flat seats 2 and 2$^a$ respectively, between slides 3 within a steam-chest 4. Said valves separately control the admission of steam at opposite ends of the cylinder 5 of the engine, through ports 6 and 6$^a$ respectively.

They are shown connected together by a junction-piece 1$^b$ and with a common valve rod or spindle 7, by a pin 8 carried on said junction-piece and extending into an eye 7$^a$ on said rod. This junction-piece may be of the skeleton form shown in detail in Figs. 7A, 7B, and 7C.

The aforesaid rod 7 is mounted centrally on said junction-piece, the eye 7$^a$ thereof being advantageously formed in an enlargement embodying oppositely extended shoulder-portions 7ᵇ, 7ᵇ of square cross-section as shown in Fig. 7C. A recess 1ᶜ is provided in the junction-piece to accommodate said eye 7ª and shoulder-portions 7ᵇ of the shaft. This recess is formed in a pendant-portion 1ᵈ of the junction-piece which carries a boss 1ᵉ extending upwardly into a recess 7ᶜ formed in the lower surface of the shaft enlargement for the eye 7ª.

The aforementioned pin 8 is fixed to said pendant-portion of the junction-piece as shown in Figs. 7A and 7C and the rod 7 is placed or dropped loosely in position on said pin. The ends of this rod are adapted to pass through recesses 2ᵇ, one of which (shown in Fig. 7B) is formed in the upper surface of the aforementioned main valves 1 and 1ª. The ends of said rod also pass through recesses formed in the undersurface of superposed expansion valves to be decribed hereinafter.

The main valves 1 and 1ª are provided respectively with a number of steam inlet ports 9 communicating with a chamber 10 formed in the valve body and having a large outlet port 11 arranged to cooperate with the corresponding steam inlet port 6 or 6ª of the cylinder.

The main steam admission valves of an engine embodying this invention may be operated in various ways. In this instance they are operated by valve gear suitably arranged in connection with a movable floating lever driven from the valve gear, as hereinafter described. The travel of these valves may be reversed as in the case of an ordinary reversing engine, by endwise movement of a block working in a slotted link pivoted for driving by an eccentric or equivalent element associated with the crank shaft, such block being connected to the valves through a radius rod forming part of the valve gear for reversing the engine.

Mounted slidably on the main steam valves 1 and 1ª, are flat faced expansion valves 14 and 14ª respectively having a number of longitudinally spaced ports 15 adapted to register with the steam inlet ports 9 of the first mentioned valves. These expansion valves are connected together by a sleeve 16 secured on a common rod 17, the arrangement being such as to allow admission of a full supply of steam alternately to each end of the cylinder 5 and to afterwards cut-off upon relatively small movement of the expansion valves. These expansion valves 14 and 14ª may be otherwise connected together, such as by elongate angle pieces 14ᵇ and 14ᶜ to prevent rocking of the valves. As indicated in Fig. 7C, they are formed with recesses 14ᵉ through which the ends of the aforementioned rod or spindle 7 are extended.

These expansion valves slidable on the main steam admission valves are in this instance actuated through a radius rod connected with a slide block in a slotted lever adapted to be oscillated by a floating lever pivoted to another block to which the main valve radius rod is also connected, the floating lever being adapted to oscillate through a link connecting therewith from the cross-head on the main piston rod as will hereinafter appear. The arrangement is such that the combined oscillating movements of the floating lever and the endwise movements of the latter slide block cause a quick admission and cut-off of the steam, thus allowing practically full boiler pressure to be admitted to the cylinder up to the point of cut-off and thereby eliminating objectionable "wire drawing" of the steam.

In order to obtain the full advantage of the invention in an engine embodying valve gear such as herein set forth, the engine cylinder is provided with separate steam admission and exhaust ports controlled by separate valves, the exhaust valves being actuated by the valve gear so that movement of the main admission valves and of the expansion valves to vary the point of cut-off of steam admission will have no prejudicial effect on the setting of the exhaust valves, which is such as to provide for full and free exhaust of spent steam at the proper times.

It is usually advantageous to provide one or more main steam admission valves at each end of the engine cylinder so as to reduce steam port clearance to a minimum, and also desirable to provide one or more exhaust valves at each end of the cylinder. It is preferable to place these oppositely functioning valves on opposite sides of the cylinder. In the case of a horizontal engine, the main steam admission valves are preferably arranged on the top sides of the cylinders while the exhaust valves are preferably located on the lower sides thereof. The exhaust valves may be of flat slide or piston type and may be provided with one or more ports for fast running engines.

In the illustrative construction, exhaust valves 18 and 18ª in the form of flat ported slides are shown controlling the passage of steam from exhaust outlets 19 and 19ª located at opposite ends on the lower side of the engine cylinder. The steam is exhausted through ports 20 and 20ª into pipes or chambers 21 and 21ª, which latter are connected to a common exhaust or take-off pipe 21ᵇ. Said exhaust valves are connected together by means permitting adjustment thereof to relative positions. In this instance they are respectively provided with bosses 22 and 22ª extending into eyes or bridles 23 and 23ª which latter connect with rods 24 and 24ª respectively extending through stuffing boxes 25 and 25ª. The adjacent ends of these rods are oppositely threaded and engaged by a turnbuckle or coupling 26.

As thus connected, the aforesaid exhaust valves are reciprocated by a slide or plunger 27 connected through link 27$^a$ to the shorter arm of a rocking-lever 28. Said lever is mounted on sleeve 28$^a$ to oscillate on a shaft 28$^b$, which latter is supported in bearings forming part of brackets 29 secured to the exhaust steam chest cover of the cylinder (see Figs. 3 and 7). In the case of a locomotive as here represented, this would be at the end of the cylinder nearest the smoke funnel into which the aforementioned pipes 21 and 21$^a$ exhaust. The longer arm 28$^c$ of said rocking-lever is connected to and oscillated by a coupling rod 30 extending from means hereinafter described by which the main valve rod 7 is reciprocated.

The aforesaid sleeve 28$^a$ on which the lever 28 is mounted may of course be supported by any other convenient part of the locomotive, thus dispensing with the brackets 29. Moreover, the rocking-lever 28 may otherwise be moved in synchronism with the floating lever 36 (hereinafter described) and the main steam admission valves.

In this instance the valve gear for operating the main valves 1 and 1$^a$ and the expansion valves 14 and 14$^a$ comprises a curved slotted link or sector-plate 31 hereinafter called the "main link" which is supported intermediately in trunnions 31$^a$ of brackets 31$^b$, the latter being fixed to a solid base such as the "spectacle plate" 31$^c$ carrying one end of the slide-bar 32 for the piston cross-head 33 of the locomotive. The main link 31 may be oscillated by a rod 34 connected to its lower end and actuated from a tail crank (not shown) fixed on the crank-pin of a locomotive having outside cylinders as in the exemplary construction.

Said main link carries an endwise adjustable block 31$^d$ to which one end of a radius rod 35 is connected. The other end of said rod is connected at 35$^a$ to a vertically disposed floating lever 36 which is pivoted at 36$^a$ (near its upper end) to a slide block 37, the latter being mounted in guides 37$^a$ fixed to the front end of the steam chest 4 of the cylinder. To a lateral extension 37$^b$ of said slide block, the main valve rod 7 is connected. The lower end of the aforesaid floating lever is connected through a link 38 to a depending extension 33$^a$ of the piston cross-head 33, which latter is connected to the piston rod 39 of the engine piston 40 (see Fig. 5).

On the opposite side of the aforesaid spectacle or transverse plate 31$^c$ is fixed a bracket 41 to which is pivoted the lower end of an oscillating slotted lever 42, which carries an endwise adjustable block 43. This last mentioned block is pivotally connected to a radius coupling-rod 44 near one end thereof. The other end of said rod is connected at 44$^a$ to a plunger 45 working in bearing 46 and connected to the expansion valve rod 17. The bearing 46 may as in the example shown be carried by a bracket 47 (see Fig. 2), which, as in the present instance, may be bolted to the main frame-plate 48 of a locomotive. The upper end of the oscillating lever 42 is connected by a coupling-rod 49 to an upward extension 36$^b$ of the aforesaid floating lever above the point of the latter's connection with the slide-block 37, so that said oscillating lever may be subject to the combined action of the floating lever and said slide-block.

In order to adjust the position of the block 43 in the slotted oscillating lever 42, the aforesaid coupling-rod 44 is extended beyond its point of connection therewith and connected at its end to the upper end of a link 50, the lower end of the latter being connected to an arm 51 which in turn is connected to a bracket 51$^a$ secured to the transverse plate 31$^c$. Said arm 51 is also connected through a link 52 to a similar arm 53 which is fixed on a horizontal shaft 54 mounted in a bearing 55 at the top of the aforesaid plate 31$^c$ and provided with a lever arm 56 having connection (as indicated) with a rod for operation from the locomotive cabin, either by hand or automatically as preferred.

For purposes of reversing the engine, the radius rod 35 (which connects with the block 31$^d$ of the main-link 31) is intermediately connected through a link 57 to a lever arm 58, which latter is fixed on a horizontal shaft 59 mounted in a bearing 60 at the upper end of the transverse plate 31$^c$ and provided with a lever arm 61 having connection (as indicated) with a rod adapting it to operation within the locomotive cabin either by hand or foot-lever in the usual way.

For forward running of the engine, the block 31$^d$ will be moved to one end of the slotted main-link and for backward running of the engine will be moved to the opposite end of said link without affecting the setting of the oscillating lever 42 or the block 43 therein and the indirectly connected expansion valves 14 and 14$^a$.

Extending laterally from the aforesaid slide-block 37, a gudgeon pin 62 is provided for connection therewith of one end of the aforesaid coupling-rod 30 (see Fig. 2) by which the lever 28 is oscillated to reciprocate the exhaust valves 18 and 18$^a$ as hereinbefore described.

In the modified construction shown in Figs. 8 and 9, the main steam admission valves are in the form of pistons 63 and 63$^a$ arranged to reciprocate in fixed cylindrical liners 64 and 64$^a$ formed respectively with an annular set of ports 65 and 65$^a$ communicating with annular passages 66 and 66$^a$, while the latter communicates respectively with the steam inlet ports 6 and 6$^a$ at the ends of the engine cylinder. These piston valves are shown connected together by a slotted sleeve or junction-piece 67. They are also held between end-plates 7ˣ and 7ʸ by the valve-actuating rod 7, which in this instance extends therethrough and is provided with tightening nuts 7ᶻ.

The expansion valves also are in the form of pistons 69 and 69ᵃ arranged to slide respectively within the aforementioned main valves 63 and 63ᵃ. They are provided respectively with an annular set of steam ports 70 and 70ᵃ for controlling the passage of steam to annular sets of steam ports 71 and 71ᵃ in their associated main valves 63 and 63ᵃ. The outer ends of the valves also control the passage of steam to other annular sets of steam ports 71ᵇ and 71ᶜ in said main valves. These expansion valves are shown connected together by a sleeve or junction-piece 72 in turn connected to the valve-actuating rod 17.

The separate exhaust valves 18 and 18ᵃ (one of which is shown in Fig. 9) are operated by surrounding bridles 23 and 23ᵃ respectively connected thereto as represented in Figs. 5 and 9.

The wheels of the locomotive to which the engine is applied are represented at 77, 78 and 79.

The operation of the engine equipped with steam admission, expansion and exhaust valves with actuating gear of the novel character and arrangement hereinbefore described will doubtless be obvious to those skilled in the art or familiar with the operative principles of steam engines of this class, but for the sake of entirely clear understanding is here set forth as follows.

Referring to Figs. 1 to 9 and more particularly to Figs. 1 and 5, let it be assumed that the valve gear is in position for forward running, with the block 31ᵈ at the bottom of the slot in the main link 31. Steam will then be admitted to the engine cylinder through its port 6ᵃ behind the piston 40, causing the latter to move outward (i. e. toward the left) and turn the crank shaft, thereby moving the valve operating eccentric thereon (not shown) so as to rock the main link and floating lever 36 to move the main valve spindle 7 to the right. This motion continues until the eccentric having moved to an angular position corresponding to a dead center, ceases to rock the main link.

Movement thus imparted to the valve 1 is insufficient (due to its lap, to fully uncover the port 6 and admit steam at the other end to return the piston on its inward stroke, but on the piston's continued outward movement, the floating lever 36 (turning on its pivot 35ᵃ) will cause the valve rod 7 (pivoted thereto at 36ᵃ) to quickly complete the valve's travel to the right so as to fully uncover said port, the pivot 35ᵃ having previously come to rest or nearly so. At the moment when the port 6 is thus quickly and fully opened to steam, the piston will have nearly completed its stroke to the left and the steam previously therebehind will have expanded and be ready for exhaust. At this same moment, the exhaust ports 20ᵃ are simultaneously open to exhaust by the rocking of the lever 28 (connected to the aforesaid floating lever at 36ᵃ), so that the spent steam may pass to the atmosphere.

During the described outward stroke of the piston, the upper end of the floating lever swings and moves the slotted link 42 (through rod 49) so as to cause the expansion valve 14 to quickly overtake the main valve and cut off the steam thereto from the steam chest 4 by bringing its openings 15 out of register with the ports 9 in said main valve. Upon moving the block 43 within the link 42, the stroke of the expansion valve may be varied as required.

The described actions are of course reversely repeated on the backward or opposite stroke of the piston. As the piston completes its outward stroke the engine crank reaches dead center position and the eccentric meanwhile has moved to bring the main link into a position at which it is moving most rapidly to the right so as to keep the valve 1 open through the intervention of the rod 35 and the floating lever, thus maintaining the position of the valve against the inward motion of the floating lever by reason of its connection to the slide block 33 which, at this time, is moving toward the inner or right end of the cylinder.

For reversal of the engine the block 31ᵈ is simply moved to the upper end of the main link, in which position it opens and closes the valve 1 at the equivalent to the eccentric's displacement of 180°, while the block 43 of the expansion link requires no readjustment to adapt said link to the reversed travel of said valve.

The foregoing description has reference to an engine of the reversing type as hereinbefore stated. For a non-reversing engine the aforementioned main link 31 with block 31ᵈ (Figs. 1, 2 and 3) may be omitted and replaced by a lever 75 pivoted at 75ᵃ as represented in Fig. 10, wherein said lever is shown with one end connected to a rod 76 (corresponding with rod 34) for oscillating the same from an eccentric or equivalent means associated with the crank-shaft of the engine, and its other end connected to the radius rod 35 which connects with the floating-lever 36 as hereinbefore described. In such an engine, the lever 56 for adjusting the point of steam cut-off would generally be operated automatically by a governor.

By the use of steam admission and expansion valves with actuating gear as herein described, the engine may be operated in such manner that spent steam can exhaust freely from the cylinder, thereby eliminating the back-pressures which have heretofore so detrimentally affected the efficiency of reciprocating engines of the expansion valve type. By use also of separate exhaust valves, the initial condensation of steam in cylinder and ports may be avoided, thereby adding still further to the increased efficiency of the engines and particularly to those fitted with reversing gear.

The combined actions and effect of the valve gear herein described is such as to produce a thoroughly efficient high-speed expansion engine, the indicator diagrams or work charts of which will be similar to those obtained from engines fitted with Corliss valve gear.

While the invention is described in application to a locomotive, it is obviously applicable to reciprocating engines of various kinds, including marine engines.

Moreover, valve gear according to this invention which utilizes the described slotted lever for operating the expansion valve or valves operated directly from parts operating the main steam admission valve or valves (rather than by a separate eccentric or equivalent means associated with the crank-shaft of the engine) may advantageously be used in engines of different types from that herein described, owing to its simplicity and effectiveness in enabling the steam admission ports to be opened and closed quickly.

As the invention may be applied to various types of engines requiring arrangement of parts in variable form and in different combination and sub-combinations, it is not intended that it shall be limited by the appended claims to the specific construction and arrangement of parts as hereinbefore described and illustrated.

Having thus described my invention, what I claim as new and desire to secure by Letters Patent of the United States is:

1. In combination with a steam engine embodying a cylinder having a steam admission port, main and expansion valves movable relatively to the port for controlling the steam passage to the cylinder, rods separately connected with said main and expansion valves for co-operatively actuating the same, a piston and a slide block reciprocated thereby, a valve operating gear comprising a floating lever connected near its upper end with the actuating rod of the main valve, a link connecting the lower end of said lever to said slide block, a stationary support, a member pivoted to said support, means for oscillating said member from an eccentric on the crank shaft of the engine, a rod connecting said member with said floating lever at a point in the latter between its connections with said slide block and the actuating rod of the main valve, a slotted link pivoted at one end to said support and having a rod connecting its other end to said floating lever at a point above its connection with said actuating rod, an adjustably movable block in said slotted link and a rod connecting the last mentioned block to the actuating rod of the expansion valve.

2. In combination with a steam engine including a cylinder having separate steam admission and exhaust ports, separate main-admission and exhaust valves independently controlling the admission and exhaust ports, expansion valves co-operating with the main admission valve to control the supply of steam through the admission ports, rods for separately reciprocating the main-admission and expansion valves, a piston and a slide block reciprocated thereby, a valve operated gear comprising a floating lever having intermediate pivotal connection with the main-admission valve rod and lower end link connection with said slide block, means including a rod connecting with said floating lever at its aforesaid intermediate point for reciprocating the exhaust valves simultaneously with the main-admission valves but in direction opposite thereto, a pivoted member carried by a stationary support, means oscillating said member for an eccentric on the engine crank-shaft, a rod connecting said member to the floating lever at a point in the latter between its connection with the main admission valve rod and the slide-block so as to oscillate said lever by said member, a slotted link pivoted at one end to the stationary support and having a rod connecting its other end to the upper end of said floating lever above the point of connection with said main valve rod, a block adjustable endwise in said slotted link, means for adjusting the last named block in said slotted link and a rod connecting said block to the expansion valve rod.

3. In a reversible steam engine embodying a cylinder having separate steam admission and exhaust ports, separate main-admission and exhaust valves independently controlling the admission and exhaust ports, expansion valves co-operating with the main-admission valves to control the supply of steam through the admission ports, rods for separately reciprocating the main-admission and expansion valves, a piston and a slide block reciprocated thereby, a valve operating gear comprising a floating lever having intermediate pivotal connection with the main-admission valve rod and lower end link connection with said slide block, means including a rod connected with said floating lever at its aforesaid intermediate point for reciprocating the exhaust valves simultaneously with but in opposite directions from the main-admission valves, a stationary support, a slotted reversing link member intermediately pivoted to said support, means oscillating said link member from an eccentric on the engine crank shaft, a die block movable endwise in the link member, a rod connected between said die block and the floating lever at a point in the latter between its connections with the main-admission valve rod and the aforesaid slide block so as to oscillate said lever with said link member, means for moving said die block endwise in the link member for the purpose of reversing, a second slotted link pivoted at one end to said support and having a rod connecting its other end to the upper end of said floating lever above its point of connection with said main valve rod, another die block movable endwise in said second slotted link, a rod connecting said another die block with the expansion valve rod and means for adjusting the position of the last mentioned die block in its slotted link.

4. In a steam engine embodying a cylinder having separate steam admission and exhaust ports, separate main-admission and exhaust valves independently controlling the admission and exhaust ports, expansion valves co-operating with the main admission valves to control the supply of steam through the admission ports, rods for separately reciprocating the main-admission and expansion valves, a piston and a slide block reciprocated thereby, a valve operating gear comprising a floating lever having intermediate pivotal connection with the main-admission valve rod and lower end link connection with said slide block and an intermediately pivoted lever having rod connection at one end with said floating lever at its aforesaid point of connection with the main valve rod and a connection at its other end with the exhaust valve for reciprocating the latter simultaneously with but in opposite directions from the main-admission valves, an intermediately pivoted link member carried by a stationary support, means oscillating said member from an eccentric on the engine crank-shaft, a rod connecting said link member with said floating lever at a point in the latter between its connection with the slide block and the main-admission valve rod so as to oscillate said lever by said member, a slotted link pivoted at one end to the stationary support and having a rod connecting its other end to the upper end of the floating lever above its point of connection with said main valve rod, a die-block adjustable endwise in said slotted link, means for adjusting said die-block in the slotted link and a rod connecting said die-block with the expansion valve rod.

5. In a reversible steam engine embodying a cylinder having separate steam admission and exhaust ports, separate main-admission and exhaust valves independently controlling the admission and exhaust ports, expansion valves co-operating with the main admission valves to control the supply of steam through the admission ports, rods for separately reciprocating the main admission and expansion valves, a piston and a slide block reciprocated thereby, a valve operating gear comprising a floating lever pivotally connected intermediately to the main-admission valve rod and having link connection at its lower end with said slide block, an intermediately pivoted lever having rod connection at one end with said floating lever at its aforesaid point of connection with the main valve rod and a connection at its other end with the exhaust valves for reciprocating the latter simultaneously with the main admission valves, a stationary support, a slotted reversing link intermediately pivoted to said support and oscillated from an eccentric on the engine crank shaft, a die block movable endwise in said link, a rod connecting said die block to the floating lever at a point between its connections with said slide block and the main-admission valve rod, reversing mechanism for moving said guide-block endwise in said link, a second slotted link pivoted at one end to said support and having a rod connecting its other end to the upper end of the floating lever above its point of connection with the main valve rod, another die block movable endwise in said second slotted link, a rod connecting said another die block with the expansion valve rod, and means for adjusting the position of the last mentioned die block in its slotted link.

6. A valve operating structure for a steam engine comprising in combination with the engine cylinder, piston and cross-head or slide-block reciprocated thereby, a floating lever having a long arm rocking connection with said cross-head and an intermediate swivel connection with a member for reciprocating the main steam admission valves of the cylinder; a pivotally supported link oscillated from the crank shaft of the engine and carrying a block endwise movable thereon in an arc; a rod connecting said block with the floating lever at a point between the latter's connections with said valve reciprocating member and cross-head; means for shifting said block endwise of said link from a remote point of engine control for changing the main valve movement and reversing the engine; another link pivotally supported at one end and having opposite end rod connection with the short arm of the floating lever beyond the latter's aforesaid point of connection with the valve reciprocating member, said another link also carrying a block endwise movable thereon in an arc, a rod connecting the block of said another link with the member reciprocating the expansion valves of the cylinder co-operatively with its main-admission valves, and means for shifting the last named block endwise of said another link from the aforesaid remote point of engine control for varying the stroke extent of the expansion valves according to work conditions of the engine.

7. A valve operating structure for a steam engine comprising in combination with the engine cylinder, piston and cross-head or slide-block reciprocated thereby, a floating lever having a long arm rocking connection with said cross-head and an intermediate swivel connection with a member for reciprocating the main steam admission valves of the cylinder and another swivel connection at the same point with a rocking member imparting reciprocal movement to the exhaust valves of the cylinder simultaneously with but in a direction opposite to the main admission valves; a pivotally supported link oscillated from the crank shaft of the engine and carrying a block endwise movable thereon in an arc; a rod connecting said block with the floating lever at a point between the latter's connections with said valve reciprocating member and cross-head; means for shifting said block endwise of said link from a remote point of engine control for changing the main valve movement and reversing the engine; another link pivotally supported at one end and having opposite end rod connection with the short arm of the floating lever beyond the latter's aforesaid point of connection with the valve reciprocating member, said another link also carrying a block endwise movable thereon in an arc, a rod connecting the block of said another link with the member reciprocating the expansion valves of the cylinder cooperatively with its main-admission valves, and means for shifting the last named block endwise of said another link from the aforesaid remote point of engine control for varying the stroke extent of the expansion valves according to work conditions of the engine.

8. A valve operating gear for a steam engine of the type embodying main steam admission and expansion valves, comprising a floating lever having a long arm rocking connection with the cross-head of the engine piston and an intermediate swivel connection with the member reciprocating the main steam admission valves; a pivotally supported link oscillated from the crank shaft of the engine and carrying a block movable endwise thereon in an arc; a rod connecting said block with the floating lever at a point between the latter's connections with the valve reciprocating member and cross-head, another link pivotally supported at one end and having opposite end rod connection with the short arm of the floating lever beyond the latter's aforesaid point of connection with the valve reciprocating member, said another link also carrying a block movable endwise thereon in an arc and a rod connecting the block of said another link with the member reciprocating the expansion valves co-operatively with the main admission valves.

9. A valve operating gear for a steam engine of the type embodying separate steam admission and exhaust valves and expansion valves co-operating with the former, comprising a floating lever having a long arm rocking connection with the cross-head of the engine piston and an intermediate swivel connection with the member reciprocating the main steam admission valves; and another swivel connection at the same point with a rocking member imparting reciprocal movement to the exhaust valves synchronously with the main-admission valves; a pivotally supported link oscillated from the crank shaft of the engine and carrying a block movable endwise thereon in an arc; a rod connecting said block with the floating lever at a point between the latter's connections with the valve reciprocating member and cross-head, another link pivotally supported at one end and having opposite end rod connection with the short arm of the floating lever beyond the latter's aforesaid point of connection with the valve reciprocating member, said another link also carrying a block movable endwise thereon in an arc and a rod connecting the block of said another link with the member reciprocating the expansion valves co-operatively with the main-admission valves.

10. In combination with a steam engine of the type embodying separate admission and exhaust valves together with expansion valves co-operating with the admission valves for controlling the steam admitted therethrough from the steam chest, a valve operating structure including a floating lever having long arm rocking connection with the cross-head of the engine piston and an intermediate swivel connection with the member reciprocating the admission valves and another swivel connection at the same point with a member imparting reciprocation to the exhaust valves synchronously with said admission valves, an oscillating link having swingingly adjustable rod connection with the floating lever at a point between the latter's connections with the admission valve reciprocating member and the cross-head and a rocking member having radius rod connection with the short arm of the floating lever beyond the latter's aforesaid point of connection with the admission valve reciprocating member and a swingingly adjustable connection also with the member reciprocating the expansion valves, whereby the last mentioned valves overtake the admission valves during operation to effect a quick cut off of steam therethrough.

JAMES THOMPSON MARSHALL.